United States Patent [19]

Hubscher

[11] Patent Number: 4,718,799
[45] Date of Patent: Jan. 12, 1988

[54] CUTTING TOOL COMPRISING A CUTTING HEAD AND A HOLDING SHANK CONNECTED THERETO

[75] Inventor: Hans R. Hubscher, Rupperswil, Switzerland

[73] Assignee: CAD Engineering Rupperswil AG., Rupperswil, Switzerland

[21] Appl. No.: 718,098

[22] Filed: Apr. 1, 1985

[30] Foreign Application Priority Data

Apr. 7, 1984 [EP] European Pat. Off. ........ 84103914.2

[51] Int. Cl.$^4$ .............................................. B23B 31/06
[52] U.S. Cl. ...................................... 409/234; 279/89; 408/239 R
[58] Field of Search ............. 408/239 R, 226; 279/83, 279/89, 90, 91, 92, 93, 94; 409/234, 232

[56] References Cited

U.S. PATENT DOCUMENTS

| | | | |
|---|---|---|---|
| 1,766,136 | 6/1930 | Markstrom | 279/89 |
| 1,823,971 | 9/1931 | Erlandson | 408/226 |
| 2,219,907 | 10/1940 | Ross | 279/93 |
| 3,022,084 | 2/1962 | Dresback | 279/83 X |
| 3,699,843 | 10/1972 | Sweeny | 409/234 X |
| 3,999,869 | 12/1976 | Clark et al. | 408/226 X |
| 4,266,895 | 5/1981 | Lewis | 409/234 X |
| 4,298,208 | 11/1981 | Benjamin et al. | 409/234 X |

FOREIGN PATENT DOCUMENTS

| | | | |
|---|---|---|---|
| 814991 | 9/1952 | Fed. Rep. of Germany | 408/226 |
| 2094191 | 9/1982 | United Kingdom | 408/239 R |
| 537760 | 3/1977 | U.S.S.R. | 408/239 R |

Primary Examiner—Gil Weidenfeld
Assistant Examiner—Glenn L. Webb
Attorney, Agent, or Firm—Bachman & LaPointe

[57] ABSTRACT

The cutting tool comprises a cutting head and a holding shank and, for transferring the torque introduced on the cutting head during machining, faces are provided in a recess of the bearing surface of the holding shank on which engage the stop faces of the cutting head. A fixed connection between the cutting head and the holding shank is brought about by a threaded pin screwed into a tapped hole on the holding shank and which projects into a conical blind hole on the cutting head. As the torque is transferred in the vicinity of the bearing surface, the threaded pin is only loaded to the extent that there is a clearance-free connection between the cutting head and the holding shank.

4 Claims, 5 Drawing Figures

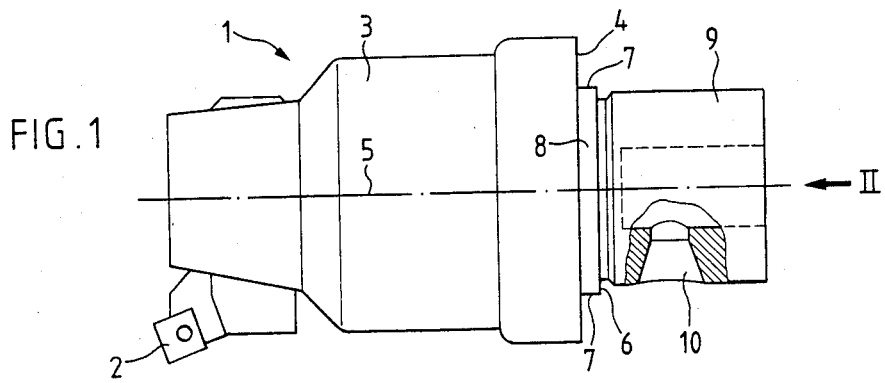
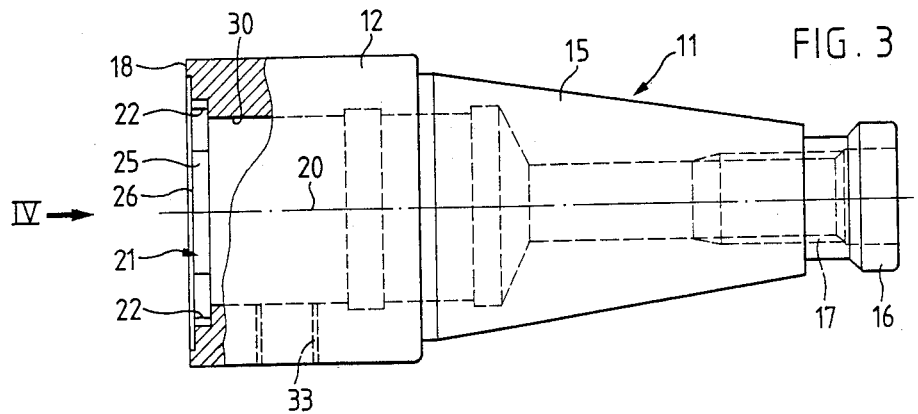
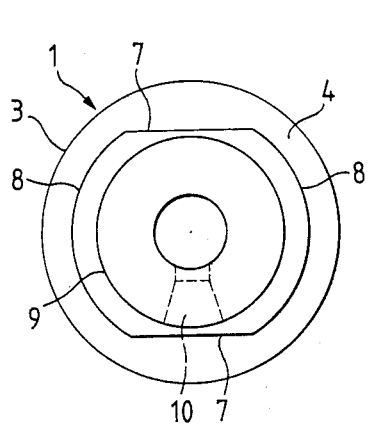
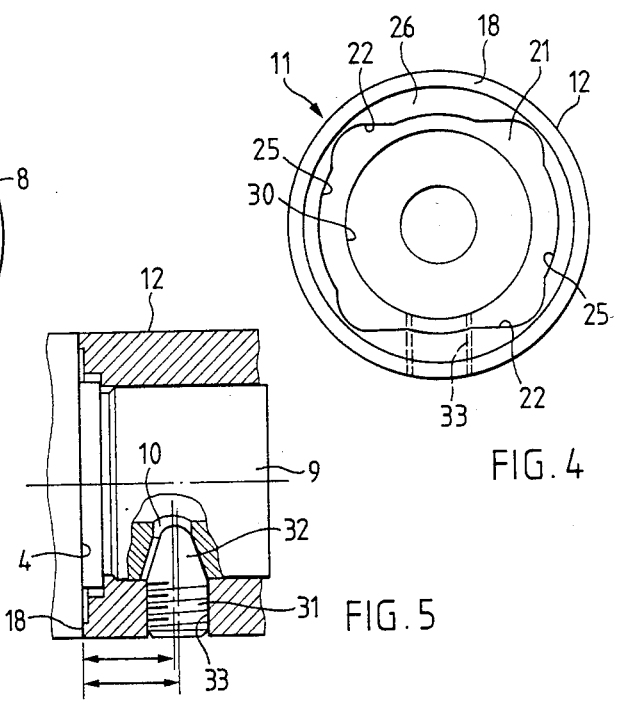
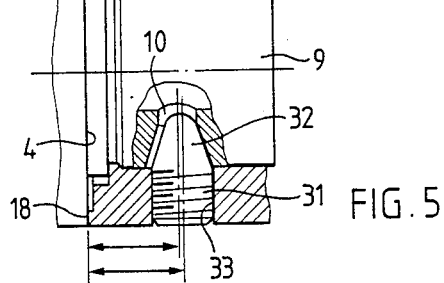

CUTTING TOOL COMPRISING A CUTTING HEAD AND A HOLDING SHANK CONNECTED THERETO

BACKGROUND OF THE INVENTION

The invention relates to a cutting tool, which comprises a cutting head and a holding shaft or shank fixed thereto, the cutting head having a supporting surface resting on a bearing surface of the holding shank and both the supporting surface of the cutting head and the bearing surface of the holding shank are constructed as surfaces perpendicular to the tool axis.

Cutting tools constructed in two-part manner and having a cutting head and a holding shank fixed thereto are generally known machining tools. The advantage of a two-part construction is that, as a function of the machine tool used, the holding shank must always be differently constructed, whereas the actual cutting head is always the same for a particular machining operation. As a result of the two-part construction of the cutting tool, easy adaptation to a machine tool spindle or to a chuck is possible and there is no need to replace the cutting head. However, to ensure the accuracy of the cutting tool, it is necessary for the two parts, that is, the cutting head and the holding shank, to be precisely centrally interconnected.

In a known embodiment of a cutting tool (Swiss Patent No. 537,770), the precise fitting together or matching of the two parts is achieved wherein the cutting head and the holding shank are assembled by means of a cylindrical pin arranged on the side of the cutting head remote from the cutting edge and a corresponding cylindrical bore on the holding shaft arranged on the cutting head side. Although the pin and bore can be constructed very accurately, it is disadvantageous that at the junction of said two parts, which is formed by a grub screw which is screwed radially into the holding shank, the end thereof is conically shaped and engages in a corresponding bore in the cutting head pin, it is also necessary to transfer the torque occurring during machining. Moreover, as the torque can be very large, as a function of the material to be machined, not only elastic deformations, but also plastic deformations can occur at the junction and can have an unfavorable influence on the precise alignment of the cutting head in the holding shank.

SUMMARY OF THE INVENTION

The object of the present invention is to construct a cutting tool of the aforementioned type that one or only small forces have to be transferred at the junction, so that only limited elastic and no plastic deformations occur at this point.

According to the present invention, the foregoing object is achieved wherein the fixed connection between the cutting head and the holding shank is formed by pulling and fixing means embedded in the bearing surface.

BRIEF DESCRIPTION OF THE DRAWINGS

The invention is described in greater detail hereinafter relative to non-limitative embodiments and the attached drawings, wherein show:

FIG. 1 is a view of a cutting head for turning internal surfaces.

FIG. 2 is a view of the turning tool according to FIG. 1 from direction II.

FIG. 3 is a side view of a holding shank for holding the cutting head according to FIG. 1.

FIG. 4 is a view of the holding shank from direction IV.

FIG. 5 is a partial section through the junction between the cutting head and the holding shank.

DETAILED DESCRIPTION

The cutting head 1 shown in FIG. 1 has a cutting edge 2, which makes it possible to bore or turn out bores. The construction of cutting edge 2 and the mounting thereof in the cutting head 1 is of no significance for the purposes of the present invention and will not, therefore, be described. For the purposes of the invention, it is possible to use cutting heads with one, two, or more cutting edges and they can be used for different machining or cutting operations. The cutting head 1 has a circular cylindrical body 3 and on the side thereof remote from cutting edge 2 is provided a supporting surface 4, which is at right angles to the axis 5 of cutting head 1. A shoulder 6 projects from the supporting surface 4 and the circumferential surface of said shoulder 6 comprises two parallel stop faces 7 arranged symmetrically to the cutting head axis 5 and two diametrically facing, arcuate partial surfaces 8.

A securing pin 9, coaxial to axis 5, is connected to shoulder 6. Pin 9 has a radially directed, conically tapering blind hole 10 directed from the circumference of pin 9 to axis 5 and which forms part of the connection between cutting head 1 and a holding shank 11, see FIG. 3.

The holding shank 11, shown in FIG. 3, has a cylindrical shank part 12 and a conical shank part 15 having at its free end 16 an internal thread 17, which enables the holding shank 11 to be fixed in the spindle of a machine tool. The conical shank part 15 can also be constructed in some other way. In place of the cone, it is possible to provide a circular cylindrical part with an external thread connected thereto.

A bearing surface 18 at right angles to axis 20 of holding shank 11 is provided on the cutting head side of said shank 11. A recess 21 is formed in bearing surface 18 and has a shape which is shaped to the circumferential surface of shoulder 6, that is, parallel faces 22 symmetrical to axis 20 and which correpsond to the stop faces 7 of cutting head 1, as well as facing arcuate partial surfaces 25 arranged symmetrically to axis 20 and which correspond to the arcuate partial surfaces 8 of cutting head 1. Recess 21 is located in a plane 26, which is set back somewhat, approximately by 0.5 mm with respect to the bearing surface 18. The stop faces 7 of cutting head 1 engage on faces 22 of recess 21 and support thereon the torque acting on cutting head 1 during machining. As a result of the plane 26 being positioned at a somewhat lower level, even in the case of a small local plastic deformation, bearing surface 18 is not impaired. However, as a result of faces 22 for supporting stop faces 7 and arranged symmetrically with respect to axis 20, virtually no plastic deformations are to be expected at this point.

The precise alignment of cutting head 1 with holding shank 11 is achieved through the cylindrical bore 30 and not faces 22 or partial surfaces 25 of recess 21. As a result, a precise alignment of the two axes 5 and 20 is achieved.

For connecting cutting head 1 to holding shank 11, a threaded pin 31 with a conically pointed end 32 is screwed into a tapped hole 33, conical end 32 projecting into the conical blind hole 10 in securing pin 9 of cutting head 1. As the distance between the axis of tapped hole 33 and bearing surface 18 is somewhat larger than the distance between the axis of blind hole 10 and supporting surface 4, the conical end of the screwed-in threaded pin 31 engages on the conical blind hole 10, in such a way that the supporting surface 4 of cutting head 1 is pressed snugly against the bearing surface 18 of holding shank 11. As stop faces 7 of shoulder 6 of cutting head 1 have a certain amount of clearance with respect to faces 22 of recess 21, there is a slight twisting of cutting head 1 with respect to holding shank 11 on transferring a torque, so that threaded pin 31 is pressed more strongly against the blind hole 10 of cutting head 1. This ensures a connection between cutting head 1 and holding shank 11 with prestressing, so that said connection remains completely free from clearance even under the action of cutting forces.

In the drawings, the connection between cutting head 1 and holding shank 11 is provided by a threaded pin 31. However, in the case of larger diameter securing pins 9, it is also possible to provide a second or even more threaded pins 31. The arrangement of the threaded pin or pins 31 can be chosen in a random manner with respect to the cutting edges of cutting head 1, because the torque transfer takes place through the stop faces 7 of cutting head 1 and faces 22 of recess 21 in bearing shank 11 and not through the threaded pin or pins 31. In the described cutting tool, there are two stop faces 7 on cutting head 1 and corresponding faces 22 in recess 21 of bearing shank 11. However, there can also be more than two stop faces 7 and corresponding faces 22, which can be arranged in polygonal manner on shoulder 6 of cutting head 1 or in the recess 21 of holding shank 11.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A cutting tool having a central axis comprises a cutting head and a holding shank, said cutting head having a supporting surface and said holding shank having a bearing surface wherein both the supporting surface and said bearing surface lie in a plane at right angles to the tool axis and means for connecting and fixing the cutting head to the holding shank by pulling the supporting surface against the bearing surface, said means for fixing includes a pair of opposed, substantially straight parallel stop faces on a shoulder projecting from the supporting surface which engage with corresponding faces provided in a recess provided on the holding shank, said stop faces form partial surfaces on the circumferential surface of the shoulder and are connected together by a pair of arcuate partial surfaces which are arranged centrally with respect to the axis of the cutting tool so as to form a closed circumferential surface and match central partial surfaces on the inner circumferential surface of the recess provided on said holding shank such that said arcuate partial surfaces and said central partial surfaces abut so as to form a circumferential connection wherein the pair of opposed substantially straight parallel stop faces and the central partial surfaces of the recess are set back with respect to the bearing surface of the holding shank.

2. A cutting tool according to claim 1 wherein the cutting head is provided with a cylindrical securing pin adapted to be received in a circular bore provided in the holding shank wherein said securing pin and circular bore are centrally located about the axis of the cutting tool.

3. A cutting tool according to claim 2 wherein the means for connecting and fixing includes at least one radially directed blind hole provided on the securing pin, said blind hole having an axis which intersects the axis of the cutting tool and at least one radially directed tapped hole provided on the holding shank, said tapped hole having an axis which intersects the axis of the cutting tool wherein said blind hole and said tapped hole are in substantial alignment such that the distance between said supporting surface and the axis of the blind hole is less than the distance between said supporting surface and the axis of the tapped hole and means secured in said blind hole and said tapped hole for pulling the supporting surface against the bearing surface.

4. A cutting tool according to claim 3 wherein said blind hole is conical in shape and tapers in the direction of the tool axis.

* * * * *